(12) United States Patent
Fleury

(10) Patent No.: US 9,098,175 B1
(45) Date of Patent: Aug. 4, 2015

(54) GEO-LOCATION ON A DIAGRAMMATIC MAP

(71) Applicant: Google Inc., Mountain View, CA (US)

(72) Inventor: Pascal Fleury, Zurich (CH)

(73) Assignee: Google Inc., Mountain View, CA (US)

( * ) Notice: Subject to any disclaimer, the term of this patent is extended or adjusted under 35 U.S.C. 154(b) by 93 days.

(21) Appl. No.: 13/717,614

(22) Filed: Dec. 17, 2012

(51) Int. Cl.
*G06F 3/0481* (2013.01)
*G09G 5/39* (2006.01)
*G06F 17/30* (2006.01)
*G06F 3/0484* (2013.01)

(52) U.S. Cl.
CPC .................................. *G06F 3/0484* (2013.01)

(58) Field of Classification Search
CPC .............................. G06F 17/30; G06F 3/048
USPC .......... 715/764, 863; 701/520, 533; 705/26.1, 705/14.53; 345/629, 536
See application file for complete search history.

(56) References Cited

U.S. PATENT DOCUMENTS

| | | | | |
|---|---|---|---|---|
| 5,392,395 A | * | 2/1995 | Fujii et al. | 345/536 |
| 6,868,410 B2 | * | 3/2005 | Fortin et al. | 706/45 |
| 7,092,819 B2 | * | 8/2006 | Odachi et al. | 701/533 |
| 7,409,362 B2 | * | 8/2008 | Calabria | 705/26.1 |
| 7,551,206 B2 | * | 6/2009 | Fuyuki | 348/223.1 |
| 7,599,539 B2 | * | 10/2009 | Kunz et al. | 382/128 |
| 7,668,651 B2 | * | 2/2010 | Searight et al. | 701/520 |
| 8,199,362 B2 | * | 6/2012 | Yoshida | 358/1.9 |
| 8,214,779 B2 | * | 7/2012 | Lu | 716/100 |
| 8,260,006 B1 | * | 9/2012 | Callari et al. | 382/113 |
| 8,612,873 B2 | * | 12/2013 | Lin et al. | 715/764 |
| 8,797,141 B2 | * | 8/2014 | Best et al. | 340/8.1 |
| 2005/0027705 A1 | * | 2/2005 | Sadri et al. | 707/5 |
| 2009/0160873 A1 | * | 6/2009 | Kew et al. | 345/629 |
| 2012/0010996 A1 | * | 1/2012 | Horvitz et al. | 705/14.53 |
| 2012/0131515 A1 | * | 5/2012 | Rice | 715/863 |

OTHER PUBLICATIONS

Placegram, Hyungeun Jo, IEEE Transactions on Visualization and Computer graphics, vol. 16, No. 2 Mar./Apr. 2010.*

* cited by examiner

*Primary Examiner* — Jennifer To
*Assistant Examiner* — Jasmine Wan
(74) *Attorney, Agent, or Firm* — Fenwick & West LLP

(57) ABSTRACT

A location system and method receives a location to be displayed on a diagrammatic map, determines the relative position of the location to nearby map features on the diagrammatic map and using that relative position, displays the location on the diagrammatic map.

21 Claims, 10 Drawing Sheets

US 9,098,175 B1

GEO-LOCATION ON A DIAGRAMMATIC MAP

FIELD OF THE DISCLOSURE

The present disclosure is related to displaying location information in interactive diagrammatic maps.

DESCRIPTION OF THE BACKGROUND ART

Diagrammatic maps are maps that do not use a uniform scale. Examples of diagrammatic maps commonly encountered by users include maps of transit systems, ski parks, amusement parks, tourist attractions, stadiums, museums, downtown business areas, recreational parks, airports, university and college campuses, large office complexes and business parks, historical sites, and the like. Interactive maps, such as those provided in computer devices and by on-line map providers, allow for a map to be presented to the user with particular locations shown on the map. In an interactive map on a mobile device, the location shown is often intended to correspond to the user's physical location. Placing an icon representing a user's location on a standard map, which uses a uniform scale throughout, is simple if the location is known in terms of latitude and longitude because the location is just plotted on the map. However, a location cannot be placed on a diagrammatic map in this way because the diagrammatic map does not have a uniform scale.

SUMMARY

A computer-implemented method locates a point of reference (or more simply "point") on a diagrammatic map by determining the point's location relative to map features whose positions are known on the diagrammatic map. The map feature on the diagrammatic map that is closest to the point is determined. At least two additional map features are determined which together with the closest map feature form a triangle encompassing the point. The location of the point relative to the three map features is determined. Using the relative location of the point to the three map features, the point is placed at a location on a diagrammatic map.

Systems and non-transitory computer-readable storage media with executable programs stored thereon are provided that embody the disclosed methods.

The features and advantages described in this summary and the following detailed description are not all-inclusive. Many additional features and advantages will be apparent to one of ordinary skill in the art in view of the drawings, specification, and claims hereof.

DETAILED DESCRIPTION OF THE DRAWINGS

System Overview

Figure 1:
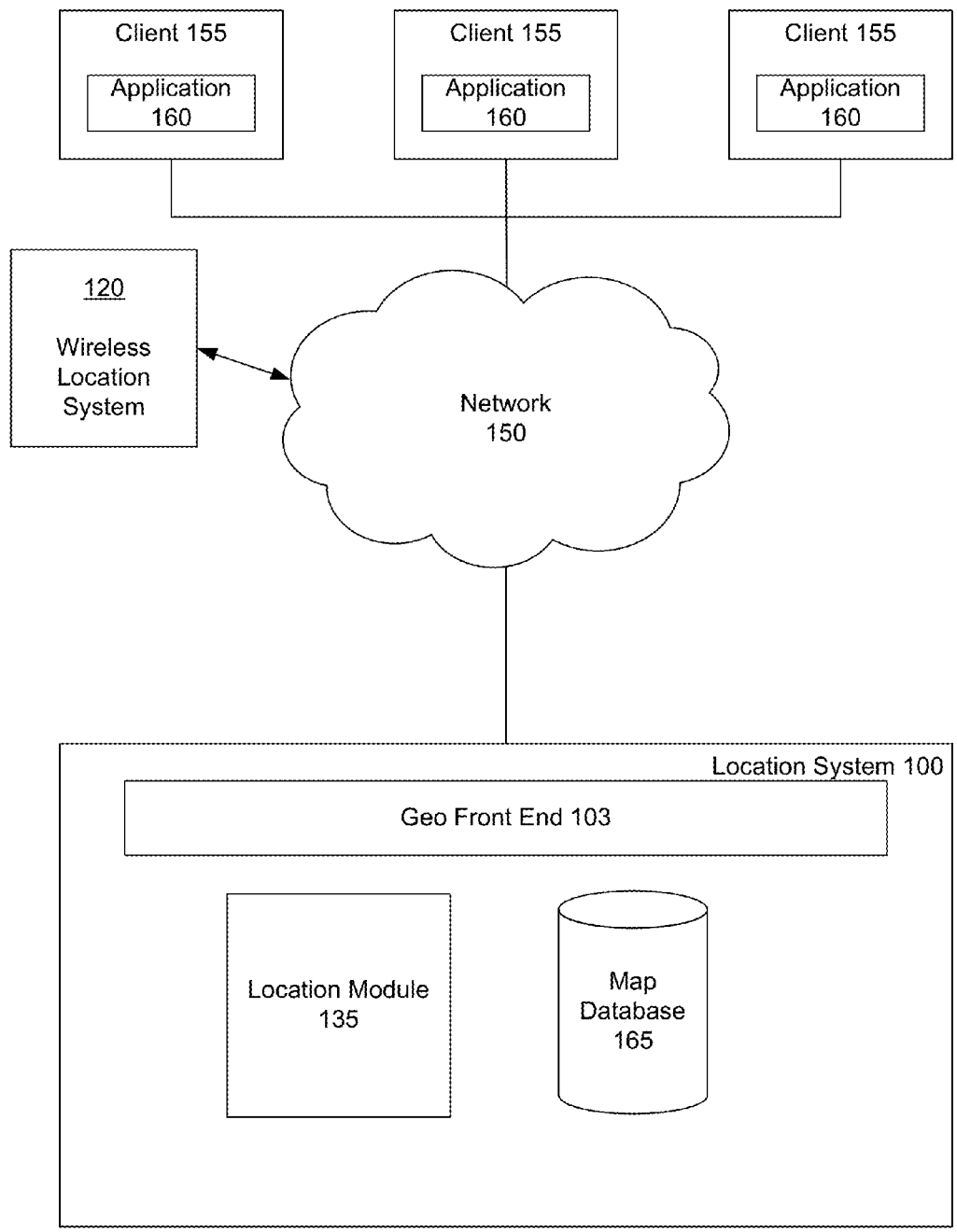
FIG. 1 is a diagram of system architecture according to one embodiment.
Figure 2:
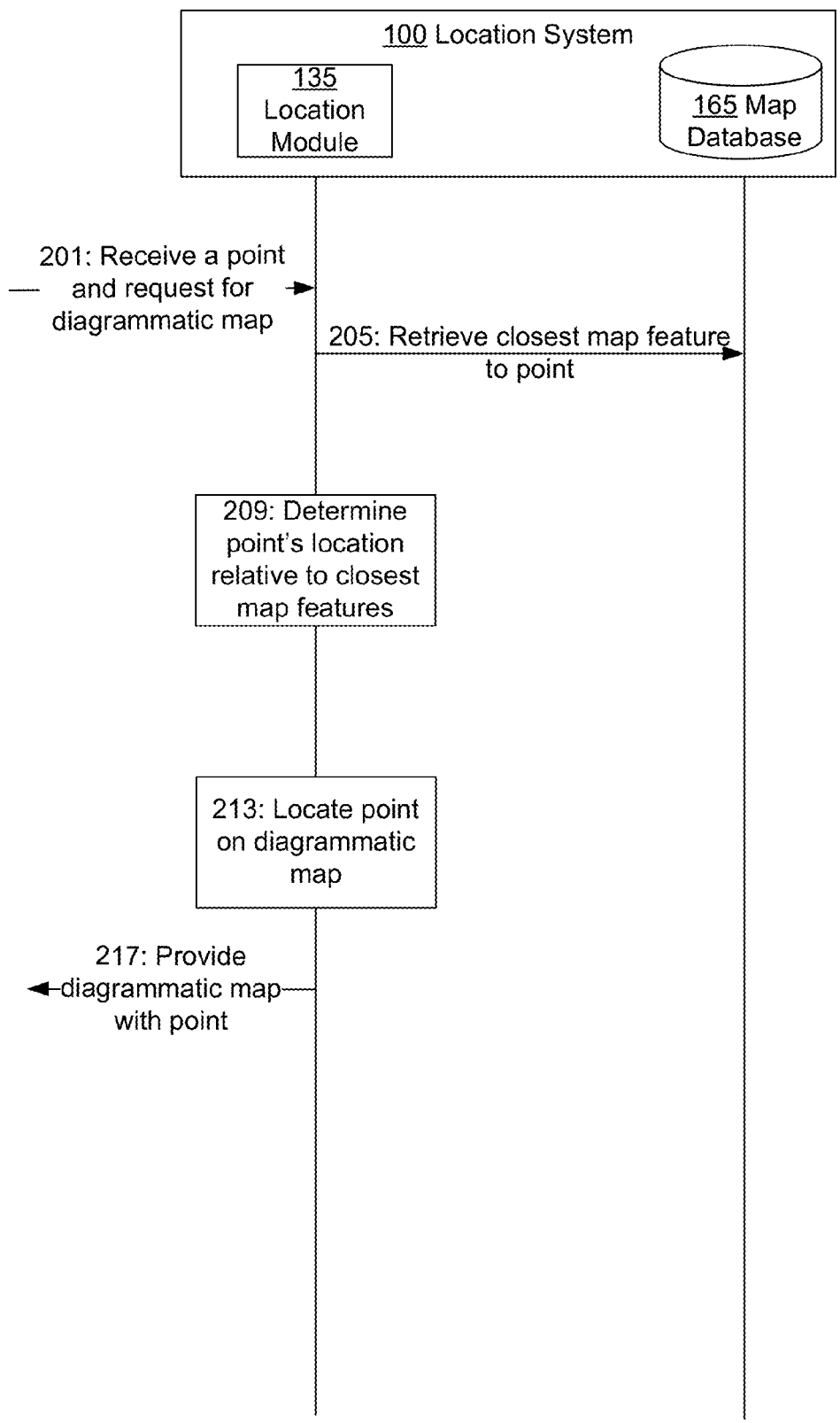
FIG. 2 is a data flow chart showing a method of locating a point on a diagrammatic map according to one embodiment.

FIG. 1 is a diagram of system architecture according to one embodiment. The location system 100 comprises a location module 135 and a map database 165. For simplicity only one location system 100, location module 135 and map database 165 are shown, but in practice many location systems 100, location modules 135 and databases 165 may be in operation.

The location module 135 receives a request for a diagrammatic map from the client 155, along with information specifying a location for display on the diagrammatic map, via the geo front end 103. The location module 135 determines a point on the diagrammatic map that corresponds to the location, and returns the diagrammatic map with the point indicated in a visually distinguished manner on the diagrammatic map to the client 155. The location module 135 is one means for performing these functions. The operation of the location module 135 is described in greater detail in reference to FIGS. 2-7.

The map database 165 stores diagrammatic maps as well as a set of map features on the diagrammatic maps, and is one means for performing this function. A map feature is an entity that is associated with a geographic location (either a point or a region); the entity may be associated with the geographic location by being located there, either currently or at some time in the past. Examples of types of map features include, but are not limited to, points of interest (POI), natural features (e.g., bodies of water, mountains, forests, parks); cities, addresses, streets, businesses, train stations, bus stations, buildings, airports, historic sites, landmarks, monuments, as well as historic events (e.g., the location of Custer's Last Stand, or Woodstock). A map feature can include its type (e.g., one of the foregoing types), a description of the map feature, as well as links or references to related information. A map feature is also stored in association with its geographic location, for example, its latitude and longitude, and optionally its street address. The location of the map feature on the diagrammatic map is stored in reference to an internal coordinate system of the diagrammatic map.

A map feature is also stored in association with information identifying its position on one or more diagrammatic maps. Because the diagrammatic map does not have a uniform scale, a map feature's position on the diagrammatic map is identified relative to that map's internal geometry and/or coordinate system, and separate from its actual latitude and longitude. For example, the map may have a coordinate system such as a grid labeled with letters on one axis and numbers on the other. Maps are images formed by an array of pixels (e.g., having a specific x,y locations in the image) and thus the pixels themselves may be used to identify the position of map features. Having the latitude and longitude of the map features allows for "translating" from the diagrammatic map to a standard map with a uniform scale. Other attributes of the map features, such as street address, name, and in the case of businesses, opening times and website addresses, may also be stored as associated with the map feature in the map database 165. The map features whose position on the diagrammatic map is known are used as references by the location module 135 when providing the position for geographic locations whose position on the diagrammatic map is not known.

The location system 100 communicates with one or more clients 155 and a wireless location system 120 via a network 150 and the geo front end 103. The network 150 is typically the Internet, but may also be any network, including but not limited to a LAN, a MAN, a WAN, a mobile, wired or wireless network, telecommunication network, a private network, or a virtual private network, and any combination thereof. In some embodiments, the location system 100 is located on the client 155.

The client 155 is any type of device that is adapted to access the location system 100 over the network 150. Examples of clients 155 include, but are not limited to, mobile devices such as a handheld computer, laptop computer, tablet computer, mobile phone or personal digital assistant (PDA) and devices that receive map information. Other examples of clients 155 include navigation devices and desktop computers. Most basically, a client 155 is configured to transmit information specifying a location to the location system 100, and receive a diagrammatic map (or information from which a diagrammatic map can be constructed) with the location indicated on the diagrammatic map. In one embodiment, the client 115 determines its location using the wireless location system 120 and transmits that location to the location system 100 to be indicated on the diagrammatic map.

The wireless location system 120 is a system which determines the location of the client 155 and transmits the location to the client 155. The client's location is defined by coordinates in two-dimensional or three-dimensional space. Examples include, but are not limited to, a global positioning system, cell phone tower triangulation and wi-fi localization, or a combination thereof.

The client 155 further comprises a client application 160 for transmitting the location to the location system 100 and receiving a diagrammatic map. For simplicity only three clients 155 are shown. In practice, very large numbers (e.g., millions) of clients 155, or as many as can be supported by the hardware and software implementation, can be in communication with the location system 100 at any time.

The location system 100 is implemented as server program executing on one or more server-class computers comprising a CPU, memory, network interface, peripheral interfaces, and other well known components. The computers themselves preferably run an open-source operating system such as LINUX, have generally high performance CPUs, with 1 G or more of memory, and 1 Tb or more of disk storage. Of course, other types of computers can be used, and it is expected that as more powerful computers are developed in the future, they can be configured in accordance with the teachings here. The functionality implemented by any of the elements can be provided from computer program products that are stored in non-transitory tangible computer accessible storage mediums (e.g., RAM, hard disk, or optical/magnetic media), or by equivalent implementations in hardware and/or firmware. As will become apparent from the description below, the operations of the location system 100, and in particular, the determination of a client 155's location on a diagrammatic map are sufficiently complex as to require their implementation in a computer system, and cannot be performed in the human mind by mental steps alone.

Process Overview

The process, as performed by location module 135 in one embodiment, of locating a point on a diagrammatic map is described in reference to FIGS. 2-7. The location module 135 receives 201 from a user's client 155 information about a location, and a request for a diagrammatic map displaying the received location. If client 155 is a mobile device, the received location may be the current location of the client 155. The location of the client 155 in such an embodiment is obtained by the client 155 from the wireless location system 120 and provided to the location.

Example I

Figure 3:
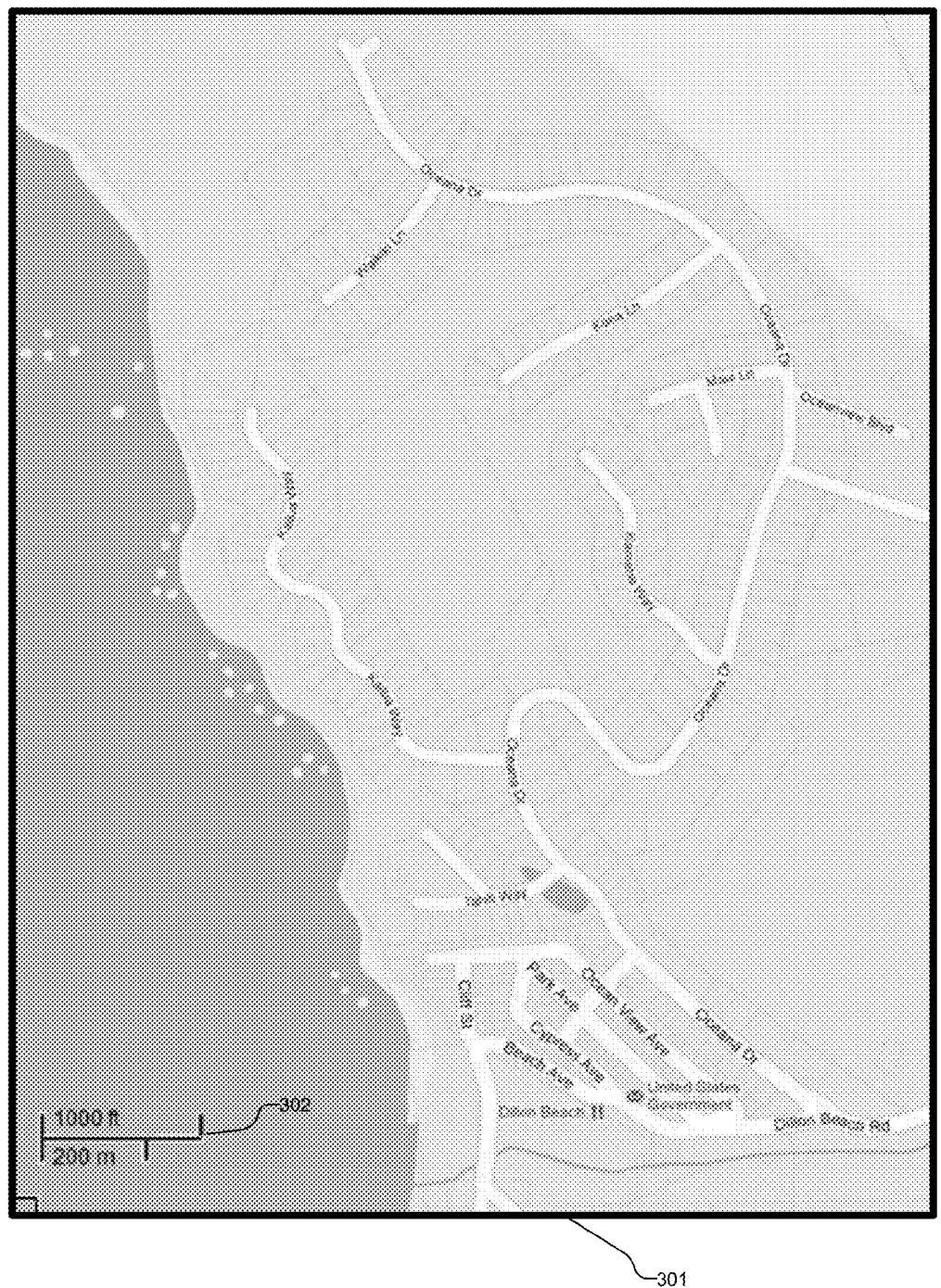
FIG. 3 is an example of a standard map of Dillon Beach.
Figure 4:
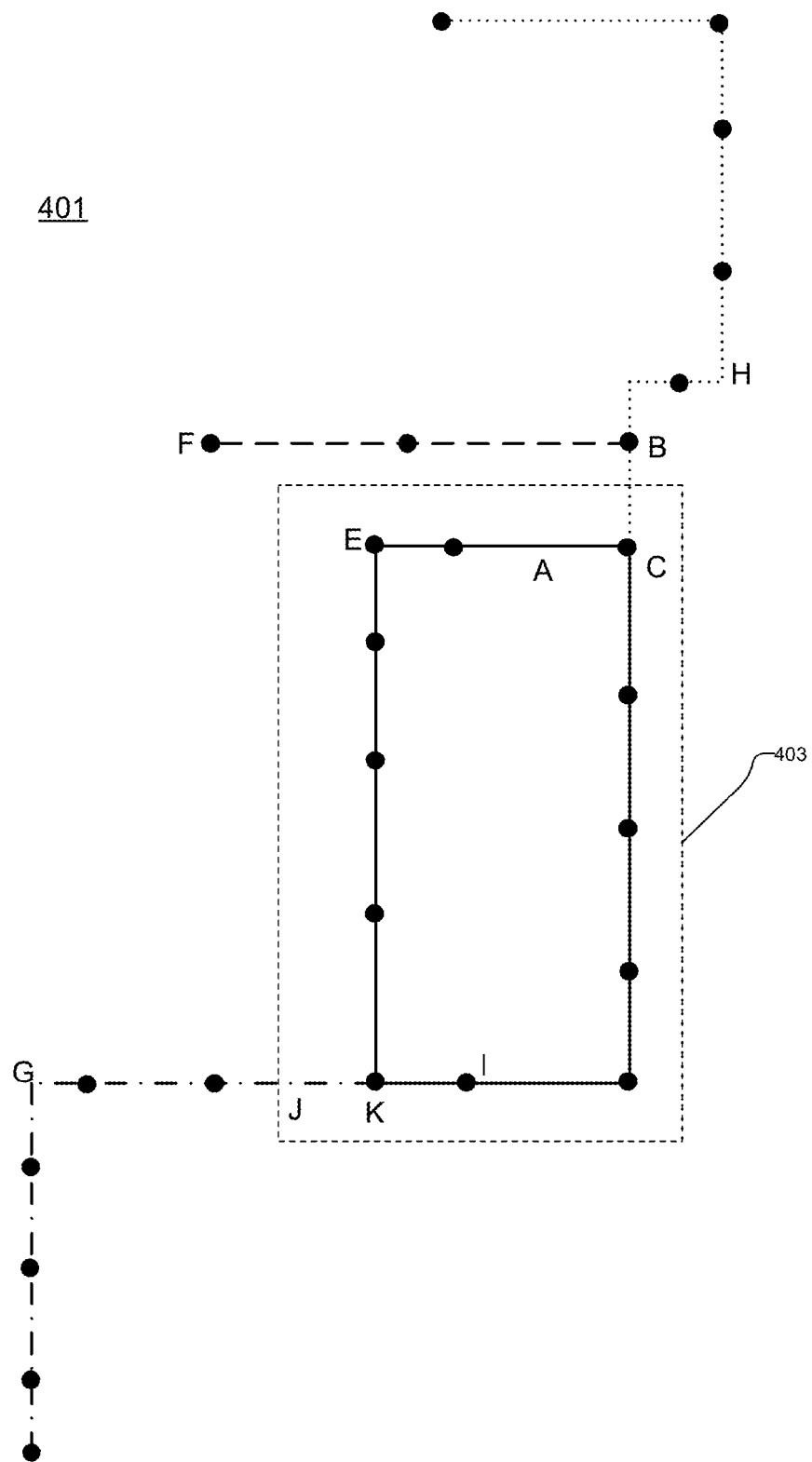
FIG. 4 is an example of a diagrammatic map of a hypothetical public transportation system of Dillon Beach showing a number of map features.

FIG. 3 is a standard map 301 of Dillon Beach, Calif. It has a uniform scale, as illustrated by scale 302. FIG. 4 is an example of a diagrammatic map, here a map 401 of routes of a hypothetical bus system of Dillon Beach, without a uniform scale such as for example in FIG. 4. The routes include a number of map features, here features A-K. The map features shown on a bus map would include bus stops, as well as landmarks that are likely to be destinations for users of the bus map and also allow the users to orient themselves. For example, map feature J is a local café and map feature K is the post office. The downtown area 403 has a larger scale than the outer portions of the bus system. Often, there are more routes and stops in a downtown area and thus it is useful to show that area in greater detail. Additionally, the routes have been simplified so that they appear to go only in straight lines and make only 90 degree turns. This is common in maps of transit systems. The map database 165 stores the geographic locations of these map features in latitude and longitude but also the location of those map features on the bus map's coordinate system. In this embodiment, the bus map's coordinate system is the pixel array of the bus map 401 image.

Figure 5:
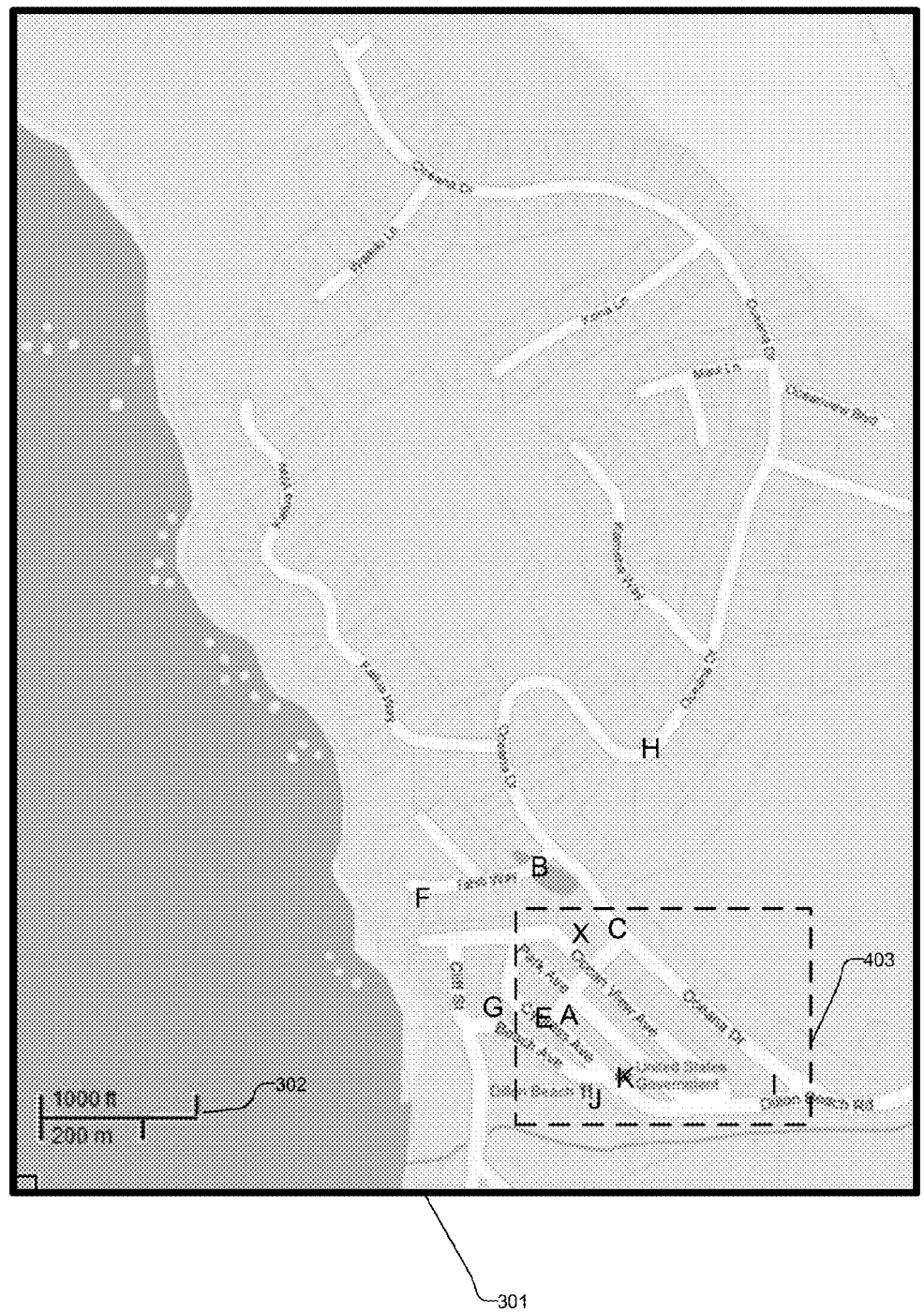
FIG. 5 is a standard map of Dillon beach illustrating the map features also shown on the diagrammatic map.

FIG. 5 illustrates the uniform scale map of Dillon Beach with the locations of the map features A-K shown. The user may be located at a geographical point, X, on the standard map and request the bus map 401 with the user's location shown. The geographical point X ("point X") is received 201 by the location module 135 as a latitude and longitude and the bus map is indicated by an identifier sent by the user. In order to place point X on the bus map, the location module 135 determines the location of point X relative to other map features whose locations on the diagrammatic map.

The location module 135 retrieves 205 the map features on the diagrammatic map closest in distance to the point X from the map database 165. The closest map feature is determined by comparing the latitude and longitude of the point to the latitude and longitude of the map features on the diagrammatic map. In FIG. 3, the closest map feature is C. The location module 135 determines 209 two additional map features on the diagrammatic map that together with map feature C form a triangle encompassing point X. In some embodiments, the two additional map features are the two map features having the shortest distance to closest map feature in addition to forming a triangle that encompasses the point X, though this latter condition is not required. The location module 135 determines the two additional map features by comparing the distance of C to neighbor map features and determining the two additional map features where the distances from C to those additional map features and the edge between the two additional map features encompass point X inside a triangle.

Figure 6C:
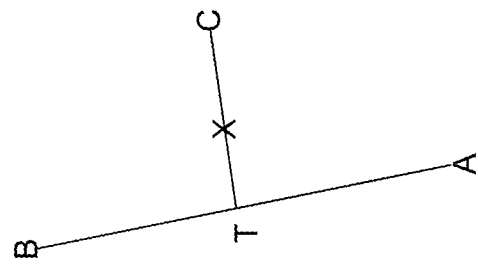
FIGS. 6A-C illustrate determining the location of a point relative to other map features.
Figure 6B:
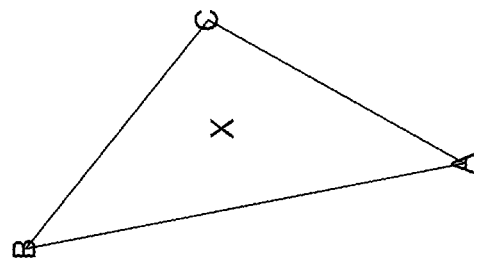
Figure 6A:
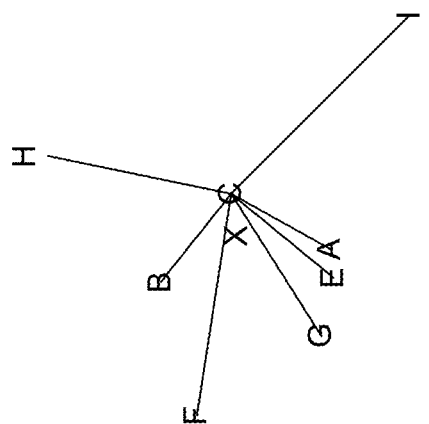

FIG. 6A illustrates this process. Point X is in the included angle between edge CF and CG but those are longer distances than edge CB and edge CA. Thus edges CB and CA are used to generate the triangle used to place X on the diagrammatic map. As illustrated in FIG. 6A, the two additional map features appear to be the closest map features that, together with map feature C, create a triangle encompassing point X. While it is possible to use two additional map features that are not the closest map features to C, using closer map features leads to a better result. This is so because the whole purpose of the method is to approximate a location for a point on a map which does not have a uniform scale. The more area in the triangle, the less accurate the location approximation for the point will be.

FIG. 6B illustrates the formed triangle of map features A, B and C and encompassing point X. In order to determine how to place point X on the diagrammatic map using the internal coordinate system of the diagrammatic map, the position of point X relative to map features A, B and C is determined 209. The location of point X is determined as a weighted average of the locations of map features A, B and C and weighting factors $w_a$, $w_b$, and $w_c$ for each of A, B and C are determined. For example, assume that the latitude and longitude coordinates for map features A, B and C and point X are:
A=(38.250510, −122.965317)
B=(38.25225,−122.965615)
C=(38.251468,−122.964452)
X=(38.251342,−122.965095)
The latitude and longitude for the four points are used to determine the contribution of each of A, B and C to the relative position of X. The equation, $X=(w_a*A+w_b*B+w_c*C)$ is used for each of the latitude coordinates and the longitude coordinates. In order to determine each of the weights, $w_a$, $w_b$ and $w_c$, two lines are drawn—one between two of the three map features, A, B and C, for example between A and B and a second line between X and the remaining map feature C. FIG. 6C illustrates these lines. The equations for the two lines are determined from the coordinates of the points on the line. Line AB has the equation y=−0.1713x−116.414. Line XC has the equation y=51.0317x−2074.987. The intersection of lines AB and XC, T, is determined from the equations:

$$-0.1713x-116.414=51.0317x-2074.987$$

and thus the coordinates of T are (38.2511,−122.9655).

It is now possible to determine the weights. We assume that the total of $w_a+w_b+w_c=1$. As X lies on line XC, $w_c$ can be determined directly as the distance CX divided by the distance CT. The distances between points are determined using the coordinates of the points using the Pythagorean theorem as is known in the art.

$$w_c=(6.5523\times10^{-4}/1.111\times10^{-3})=0.5899$$

Each of $w_b$ and $w_a$ have additional components because X is not on the line AB.

$$w_b = [(\text{distance } XT)/(\text{distance } CT)] * [1-(\text{distance } BT)/(\text{distance } AB)] =$$
$$[4.7179\times10^{-4}/1.111\times10^{-3}] * [1-(1.1557\times10^{-3}/1.76533\times10^{-3})] =$$
$$0.14665$$

$$w_a = [(\text{distance } XT)/(\text{distance } CT)] * [1-(\text{distance } AT)/(\text{distance } AB)] =$$
$$[4.7179\times10^{-4}/1.111\times$$
$$10^{-3}] * [1-(6.17729\times10^{-4}/1.76533\times10^{-3})] = 0.27606$$

These weights are then used in determining the position of X on the diagrammatic map by using the solved w1, w2 and w3 in the above equation and the positions of A, B and C on the diagrammatic map. The positions of A, B and C on the diagrammatic map are pixel coordinates for the locations on the map image and stored in the map database 165. The pixel coordinates for each of A, B and C are:
A=(50, 100)
B=(100, 150)
C=(100, 100)

The equation to determine the x pixel coordinate position for X is:

$$x=(0.27606*50+0.14665*100+0.5899*100)=87.46$$

The equation to determine the y pixel coordinate position for X is:

$$y=(0.27606*100+0.14665*150+0.5899*100)=108.6$$

Figure 7:
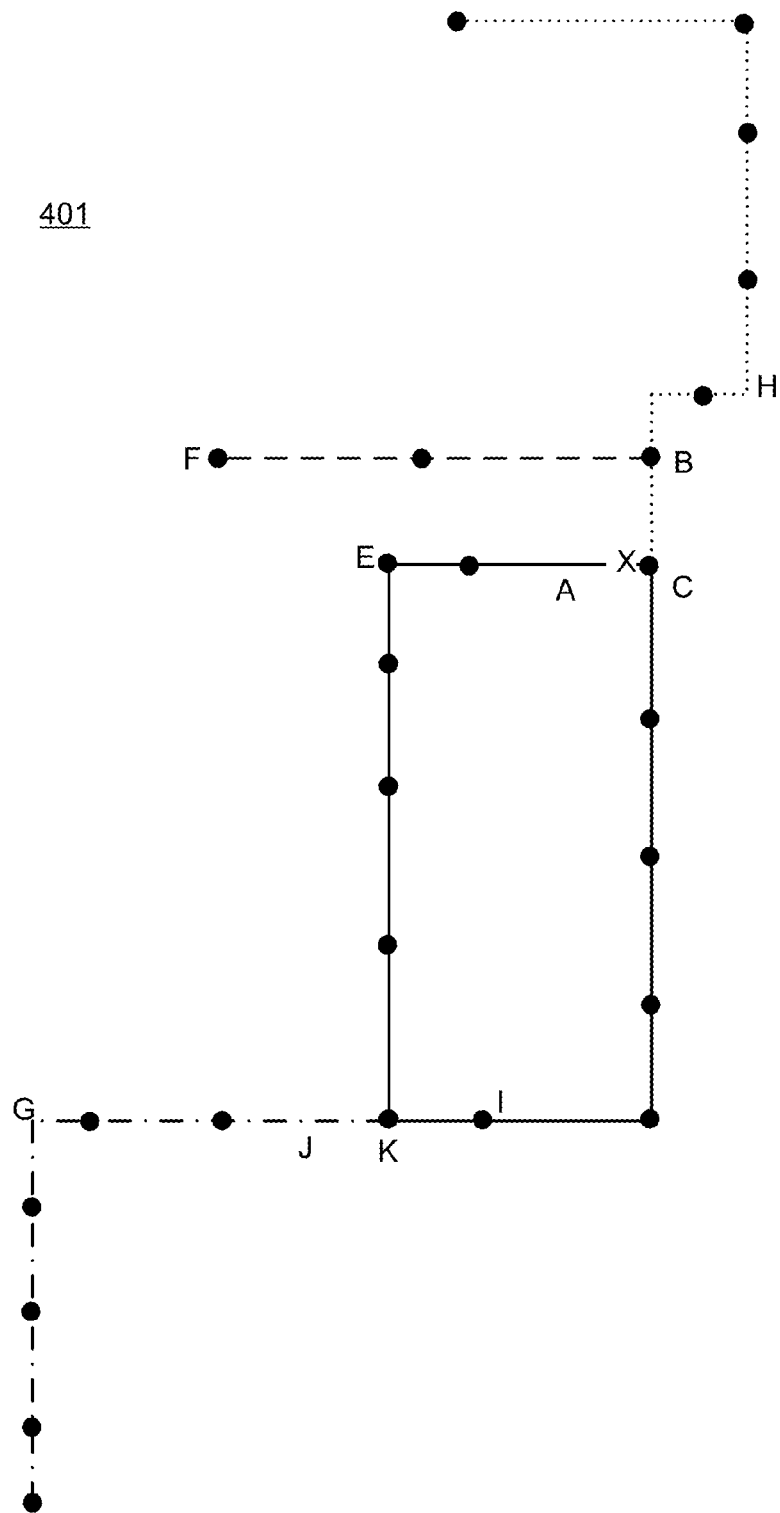
FIG. 7 illustrates a location displayed on the diagrammatic map.

Thus the position of X on the diagrammatic map is at pixel position (87.5, 108.6) as shown as FIG. 7.

Example II

Figure 8A:
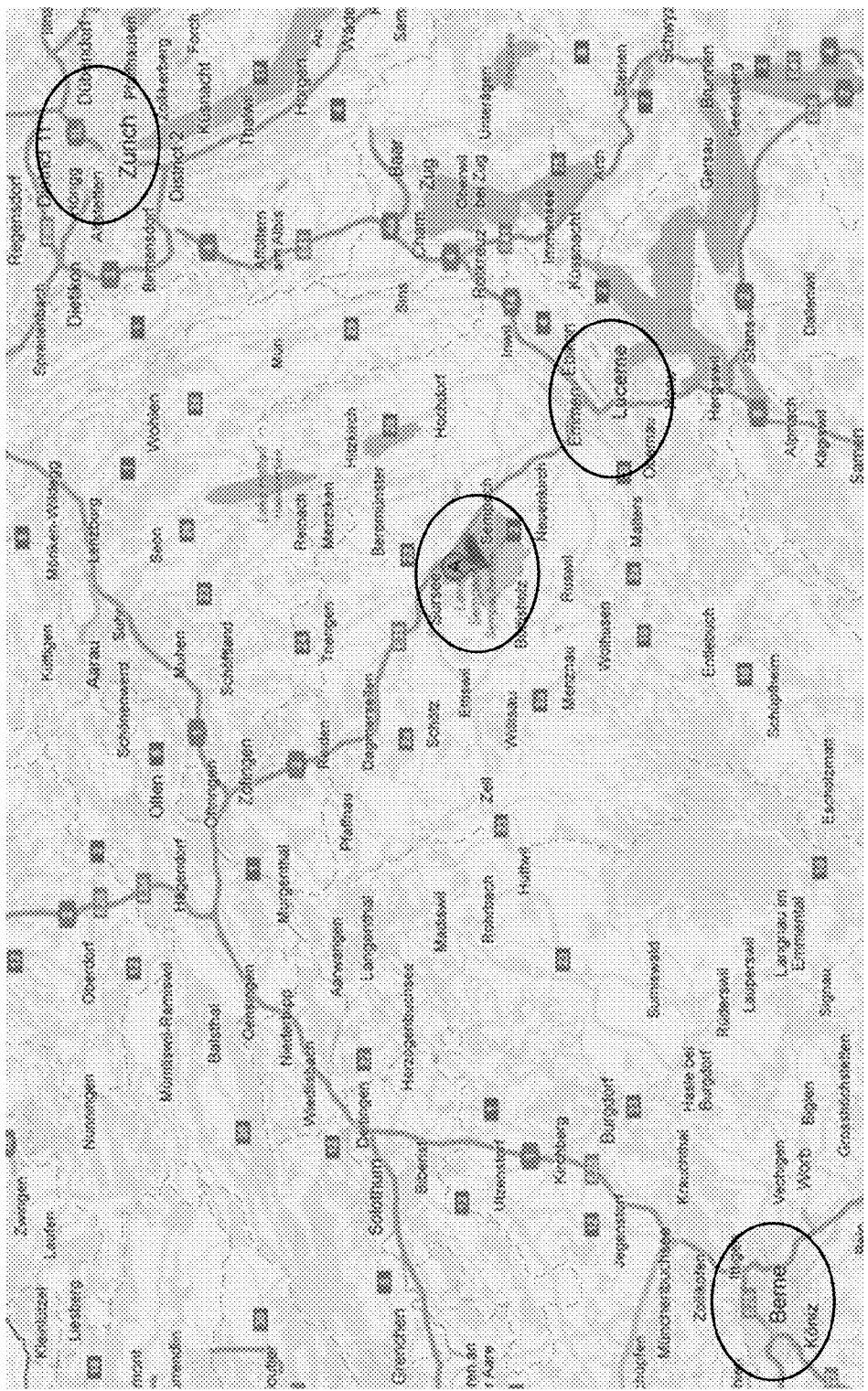
FIGS. 8A-8B illustrate another example of determining the location of a point relative to other map features.
Figure 8B:
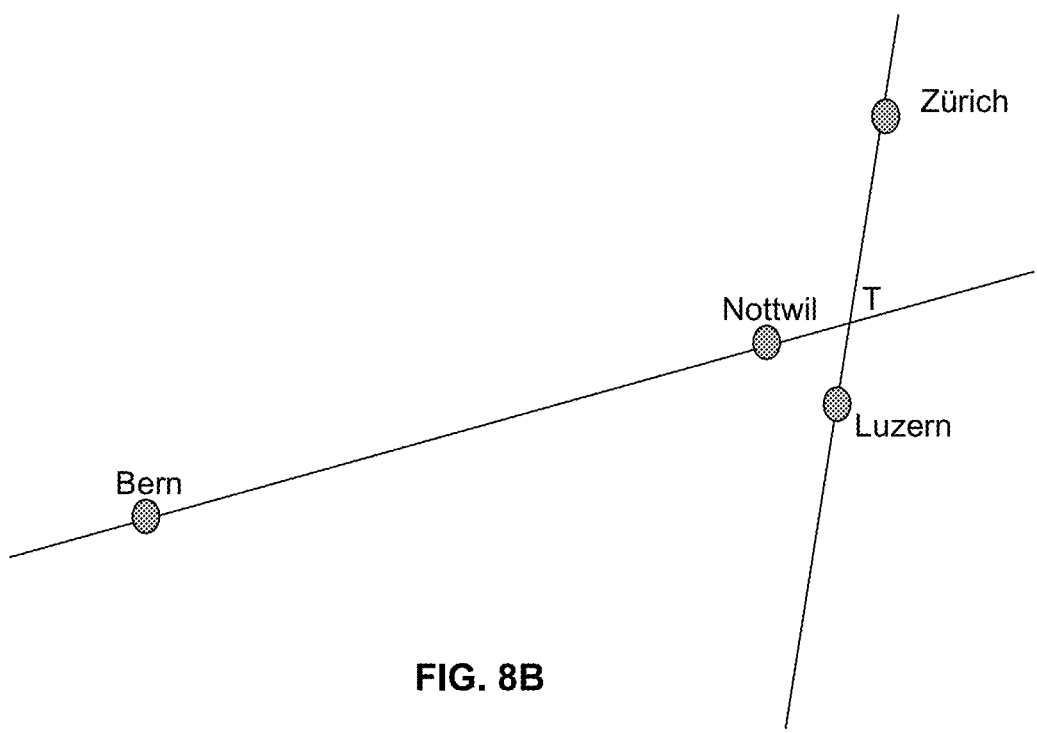
Figure 9:
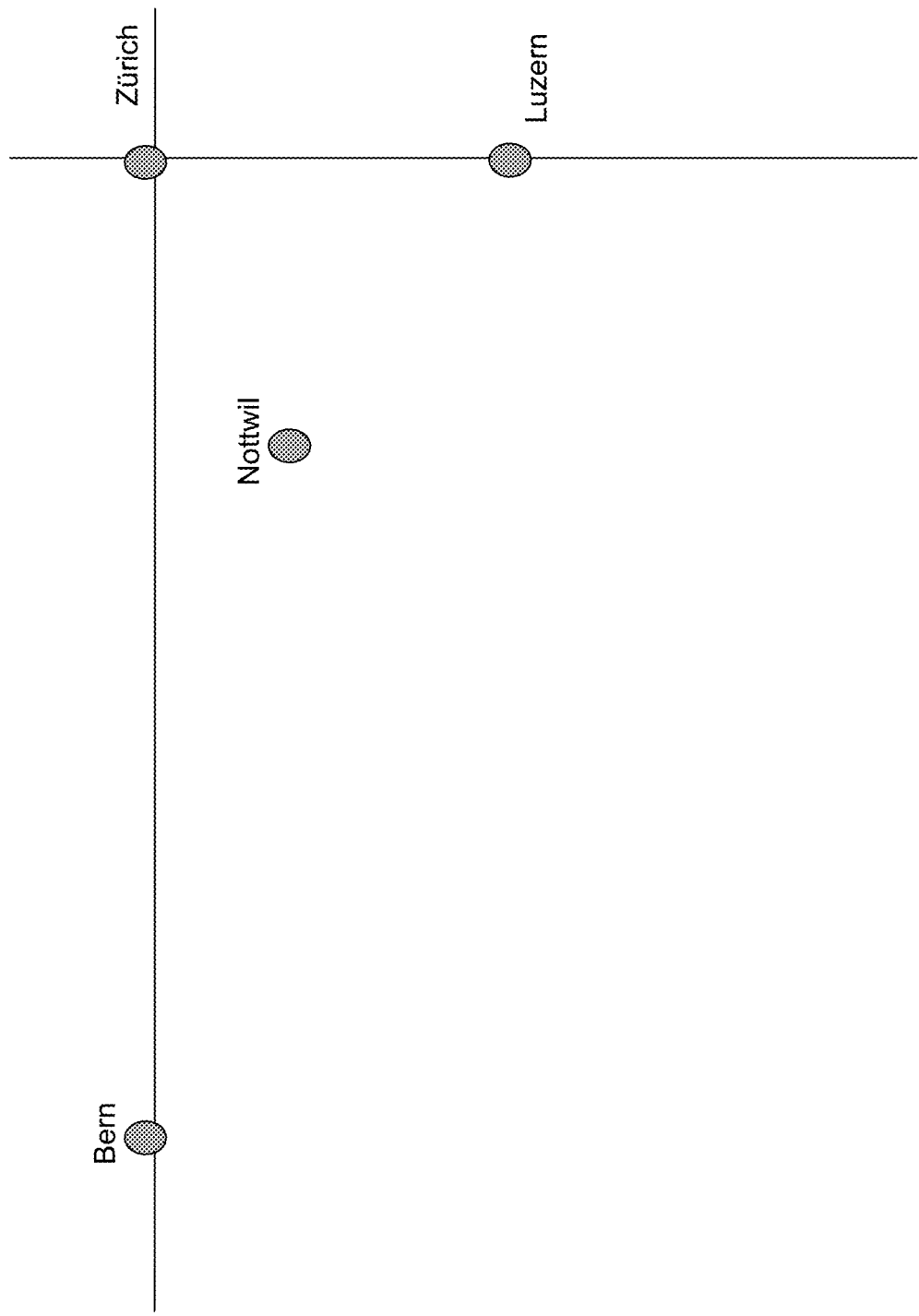
FIG. 9 illustrates another location displayed on a diagrammatic map.

FIGS. 8 and 9 illustrate an additional example. FIG. 8A illustrates the cities of Bern, Zürich, Luzern and Nottwil. A diagrammatic map, for example a railway map, might show Luzern, Bern and Zürich but not Nottwil so in this example, Nottwil is placed on a diagrammatic map. The (latitude (X), longitude (Y)) of each of the cities is as follows:
Bern=(7.439949, 46.948434)
Zürich=(8.540346, 47.378053)
Luzern=(8.31056, 47.050303)
Nottwil=(8.13487, 47.141468)

FIG. 8B illustrates the lines to be used for determining the weights of each of Bern, Zürich and Luzern in the position of Nottwil. T is the intersection of the lines between Bern and Nottwil and Zürich and Luzern and its latitude and longitude are determined to be Zürich and Luzern and Bern and Nottwil. The equation for the line between Zürich and Luzern is y=1.426x+35.19952. The equation defining the line between Bern and Nottwil is y=0.2778x+44.88161. The coordinates of the point where these two lines intersect, T, are (8.4324, 47.2241).

The weights again are assumed to have a total of 1. $w_B+w_Z+w_L=1$. The weight of the location of Bern, $w_B$, is determined directly from the equation of the line from Bern to Nottwil by dividing the distance Bern to Nottwil by the distance from T.
$w_B=0.2997$ Each of $w_Z$ and $w_L$ have additional components because Nottwil is not on the line from Zürich to Luzern. These are determined like the determination of $w_b$ and $w_a$ in Example 1.
$w_Z=0.3290$
$w_L=0.3713$ Using the weights, the position of Nottwil on a diagrammatic map of FIG. 9 is determined. The diagrammatic map on FIG. 9 may be a train map. If there is no train to Nottwil, it may not be displayed on a train map. The coordinates for the known map features of the diagrammatic map, Luzern, Zürich and Bern are:
Bern=(2,8)
Zürich=(13,8)
Luzern=(13, 4)
The longitude coordinate, x=(0.2997*2)+(0.3290*13)+(0.3713*13)=9.7033
The latitude coordinate, y=(0.2997*8)+(0.3290*8)+(0.3713*4)=6.5148.
The position of Nottwil has been illustrated on the diagrammatic map, FIG. 9.

Additional Use Cases

In some embodiments, the latitude and longitude coordinates of the locations are converted to Cartesian coordinates prior to determining the weights for determining the location of the unknown feature on the diagrammatic map. This is especially useful at higher latitudes where distortions due to use of latitude and longitude are exacerbated.

In one example use case, the disclosed method is used to provide a user with the user's location in a mountainous region. Because of the significant elevation changes on mountains, a map with varying scale may be more useful than one with a standard scale in providing a hiker with a sense of where they are in a mountainous area. This way more detail can be provided on steep portions of terrain. Such an embodiment of the disclosed method is useful for maps of ski parks as well as hiking maps.

In another embodiment, the location system 100 is on the client 155 computer and using the location system 100 does not require access to a remotely-located location system 100. In such an embodiment, the location system 100 is implemented using the computing resources of client 155.

The present disclosure has been described in particular detail with respect to several possible embodiments. Those of skill in the art will appreciate that the disclosure may be practiced in other embodiments. First, the particular naming of the modules, capitalization of terms, the attributes, data structures, or any other programming or structural aspect is not mandatory or significant, and the mechanisms that implement the disclosure or its features may have different names, formats, or protocols. Further, the system and the individual modules may be implemented as either software code executed by the computer system, or as hardware elements with dedicated circuit logic, or a combination of hardware and software. Also, the particular division of functionality between the various system components described herein is merely exemplary, and not mandatory; functions performed by a single system module may instead be performed by multiple modules, and functions performed by multiple modules may instead performed by a single module.

Some portions of above description present the features of the present disclosure in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of a method. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems. Finally, it should be noted that the language used in the specification has been principally selected for readability and instructional purposes, and may not have been selected to delineate or circumscribe the inventive subject matter. Accordingly, the disclosure of the present disclosure is intended to be illustrative, but not limiting, of the scope of the disclosure, which is set forth in the following claims.

The invention claimed is:

1. A computer-implemented method of locating a point on a diagrammatic map comprising:

storing in a map database a plurality of map features that appear on a diagrammatic map that does not have a uniform scale, each map feature having a geographical location describing a location of the map feature on a standard map having a uniform scale, and a position on the diagrammatic map expressed in terms of an internal coordinate system of the diagrammatic map;

receiving from a client device a geographical point having a corresponding geographical location on the standard map;

selecting a set of map features from among the plurality of map features that appear on the diagrammatic map based on the geographical locations of the map features, the selected map features in the set having geographical locations on the standard map forming a triangle around the geographical location of the geographical point on the standard map; and determining a position on the diagrammatic map for the geographical point based on a weighted combination of the geographical locations of the map features in the set on the standard map and the positions of the map features in the set on the diagrammatic map.

2. The method of claim 1 wherein the geographical point and the geographical locations for each map feature comprise latitude and longitude coordinates on the standard map.

3. The method of claim 1 wherein selecting a set of map features comprises:
   determining a first map feature that is closest to the geographical point on the standard map; and
   determining two additional map features wherein the two additional map features and the first map feature are vertices forming a triangle that encompasses the geographical point on the standard map.

4. The method of claim 3 wherein determining two additional map features further comprises:
   determining distances from the first map feature to a plurality of map features on the standard map; and
   selecting the two additional map features whose distance to the first map feature is the shortest.

5. The method of claim 1 wherein determining a position on the diagrammatic map for the geographical point based on a weighted average of the geographical locations of the map features in the set comprises:
   determining a first line between a first and a second of the map features in the set;
   determining a second line between a third of the map features in the set and the geographical point;
   determining an intersection between the first and second lines; and
   determining a contribution of each of the map features in the set to the weighted average based on the first and second lines and the intersection.

6. The method of claim 1 wherein the diagrammatic map comprises a map for a public transit system.

7. The method of claim 1 wherein the diagrammatic map comprises a map of a ski park.

8. A computer-implemented system comprising:
   a processor for executing program code; and
   a non-transitory computer-readable storage medium storing program code executable to:
      store a plurality of map features that appear on a diagrammatic map that does not have a uniform scale, each map feature having a geographical location describing a location of the map feature on a standard map having a uniform scale, and a position on the diagrammatic map expressed in terms of an internal coordinate system of the diagrammatic map;
      receive a geographical point having a corresponding geographical location on the standard map;
      select a set of map features from among the plurality of map features that appear on the diagrammatic map based on the geographical locations of the map features, the selected map features in the set having geographical locations on the standard map forming a triangle around the geographical location of the geographical point on the standard map; and
      determine a position on the diagrammatic map for the geographical point based on a weighted average of the geographical locations of the map features in the set on the standard map and the positions of the map features in the set on the diagrammatic map.

9. The system of claim 8 wherein the geographical point and the geographical locations for each map feature comprise latitude and longitude coordinates on the standard map.

10. The system of claim 8 wherein selecting a set of map features comprises:
    determining a first map feature that is closest to the geographical point on the standard map; and
    determining two additional map features wherein the two additional map features and the first map feature are vertices forming a triangle that encompasses the geographical point on the standard map.

11. The system of claim 10 wherein determining two additional map features comprises:
    determining distances from the first map feature to a plurality of map features on the standard map; and
    selecting the two additional map features whose distance to the first map feature is the shortest.

12. The system of claim 8 wherein determining a position on the diagrammatic map for the geographical point based on a weighted average of the geographical locations of the map features in the set comprises:
    determining a first line between a first and a second of the map features in the set;
    determining a second line between a third of the map features in the set and the geographical point;
    determining an intersection between the first and second lines; and
    determining a contribution of each of the map features in the set to the weighted average based on the first and second lines and the intersection.

13. The system of claim 8 wherein the diagrammatic map comprises a map for a public transit system.

14. The system of claim 8 wherein the diagrammatic map comprises a map of a ski park.

15. A computer program product, comprising:
    a non-transitory machine-readable storage medium having executable computer readable program code embodied therein for locating a point on a diagrammatic map, the code comprising computer readable program code executable to:
       store a plurality of map features that appear on a diagrammatic map that does not have a uniform scale, each map feature having a geographical location describing a location of the map feature on a standard map having a uniform scale, and a position on the diagrammatic map expressed in terms of an internal coordinate system of the diagrammatic map;
       receive a geographical point having a corresponding geographical location on the standard map;
       select a set of map features from among the plurality of map features that appear on the diagrammatic map based on the geographical locations of the map features, the selected map features in the set having geographical locations on the standard map forming a triangle around the geographical location of the geographical point on the standard map; and
       determine a position on the diagrammatic map for the geographical point based on a weighted average of the geographical locations of the map features in the set on the standard map and the positions of the map features in the set on the diagrammatic map.

16. The computer program product of claim 15 wherein the geographical point and the geographical locations for each map feature comprise latitude and longitude coordinates on the standard map.

17. The computer program product of claim 15 wherein program code to select a set of map features comprises program code to:
    determine a first map feature that is closest to the geographical point on the standard map; and
    determine two additional map features wherein the two additional map features and the first map feature are vertices forming a triangle that encompasses the geographical point on the standard map.

18. The computer program product of claim 17 wherein the program code to determine two additional map features further comprises program code to:

determine distances from the first map feature to a plurality of map features on the standard map; and select the two additional map features whose distance to the first map feature is the shortest.

19. The computer program product of claim 15 wherein determining a position on the diagrammatic map for the geographical point based on a weighted average of the geographical locations of the map features in the set comprises:

determining a first line between a first and a second of the map features in the set;

determining a second line between a third of the map features in the set and the geographical point;

determining an intersection between the first and second lines; and determining a contribution of each of the map features in the set to the weighted average based on the first and second lines and the intersection.

20. The computer program product of claim 15 wherein the diagrammatic map comprises a map for a public transit system.

21. The computer program product of claim 15 wherein the diagrammatic map comprises a map of a ski park.

\* \* \* \* \*